United States Patent
Rubinstein et al.

(10) Patent No.: US 8,973,100 B2
(45) Date of Patent: Mar. 3, 2015

(54) TRUST-BASED AUTHENTICATION IN A SOCIAL NETWORKING SYSTEM

(71) Applicants: Yigal Dan Rubinstein, Los Altos, CA (US); Joshua Wiseman, San Francisco, CA (US); Matthew Kai-Shing Choi, Menlo Park, CA (US)

(72) Inventors: Yigal Dan Rubinstein, Los Altos, CA (US); Joshua Wiseman, San Francisco, CA (US); Matthew Kai-Shing Choi, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/736,333

(22) Filed: Jan. 8, 2013

(65) Prior Publication Data

US 2014/0196110 A1 Jul. 10, 2014

(51) Int. Cl.
*H04L 29/06* (2006.01)
*G06Q 10/10* (2012.01)
*G06F 21/31* (2013.01)
*G06F 21/57* (2013.01)
*G06Q 50/00* (2012.01)

(52) U.S. Cl.
CPC .............. *H04L 63/08* (2013.01); *G06Q 10/10* (2013.01); *G06F 21/31* (2013.01); *G06F 21/57* (2013.01); *G06Q 50/01* (2013.01); *G06F 2221/2117* (2013.01); *G06F 2221/2145* (2013.01)
USPC .............................................. 726/3; 705/319

(58) Field of Classification Search
CPC . H04L 9/0813; H04L 29/06755; G06F 21/31; G06Q 50/01
USPC .......................................... 705/319; 726/3, 7
See application file for complete search history.

(56) References Cited

U.S. PATENT DOCUMENTS

| | | | | |
|---|---|---|---|---|
| 7,805,518 B1 * | 9/2010 | Kamvar et al. | ............... | 709/227 |
| 8,010,460 B2 * | 8/2011 | Work et al. | .................... | 705/319 |
| 8,549,651 B2 * | 10/2013 | Callahan et al. | ................ | 726/26 |
| 2004/0083394 A1 * | 4/2004 | Brebner et al. | ............... | 713/202 |
| 2012/0047560 A1 * | 2/2012 | Underwood et al. | ............. | 726/4 |
| 2012/0167162 A1 * | 6/2012 | Raleigh et al. | ..................... | 726/1 |
| 2013/0212081 A1 * | 8/2013 | Shenoy et al. | ................ | 707/706 |
| 2013/0232238 A1 * | 9/2013 | Cohn et al. | .................... | 709/220 |
| 2014/0041055 A1 * | 2/2014 | Shaffer et al. | ................... | 726/28 |
| 2014/0089400 A1 * | 3/2014 | Yan et al. | ...................... | 709/204 |

OTHER PUBLICATIONS

French et. al., "Towards a Context-Aware and Adaptable Room System for Intelligent "Trusted" Office-Spaces in Smart Cities", IEEE, Publication Year: 2012 , pp. 148-154.*

Chenyun et. al., "Privacy-preserving assessment of social network data trustworthiness" IEEE,Publication Year: 2012 , pp. 97-106.*

\* cited by examiner

*Primary Examiner* — Bradley Holder
*Assistant Examiner* — Ali Shayanfar
(74) *Attorney, Agent, or Firm* — Fenwick & West LLP (57) ABSTRACT

A social networking system determines whether a user is a real public figure or is the correct "public persona" of an individual who is famous within a particular domain. The system selects one or more trusted agents. A trusted agent is a user who has been confirmed or is otherwise trusted within the system. The system traverses the social graph of the trusted agent to score and identify additional users who have a sufficient connection to the trusted agent to authenticate them as other confirmed public personas/figures. The system computes confidence scores of the connections of the trusted agent, considering the strength of the connections and other relevant factors. The system provides confidence scores for one or more target users in the social network based on the confidence scores of the friends or connections connecting the trusted agent and the target user.

18 Claims, 3 Drawing Sheets

FIG. 3

TRUST-BASED AUTHENTICATION IN A SOCIAL NETWORKING SYSTEM

BACKGROUND

This invention relates to social networking systems and in particular to trust based user authentication in a social networking system.

Social networking systems have become an increasingly popular way for users to create connections with friends and interact with each other. Social networking systems store social information provided by users including (but not limited to) hometown, current city, education history, employment history, photos, and events the user participated in within the user's profile. Users use social networking systems to view other users' profiles, organize events, and invite friends to participate in those events.

Users within a social networking system are presumably connected based on trust and shared values/interests. But a social networking system can be abused as a platform to spread spam. For example, a spammer pretends to be a popular public figure, e.g., Lady Gaga, and a large number of people subscribe to or become his/her "friends" in an online social networking environment believing the spammer to be the public persona of the real public figure, Lady Gaga. When unsuspecting users are connected to this fake Lady Gaga (i.e., the spammer), the spammer can lure the users to visit the spammer's websites, post useless or harmful comments on the users' sites, and/or steal important user information.

Conventional user authentication methods have been used to authenticate users to detect spammers, such as manually checking the identifiers of these users, but these manual methods are computationally expensive and inefficient. In addition, there may be multiple individuals legitimately having the same name as a public figure. There is no automated way to determine which of these is the correct "public persona" of the public figure. To provide better services within a social networking system, it would be helpful to detect untrustworthy users posing as public figures and determine real public figures in an online social networking environment.

SUMMARY

A method and a social networking system are provided to authenticate a user, such as by determining whether a user is a real public figure or is the correct "public persona" of an individual who is famous within a particular domain. In one embodiment, the social networking system selects one or more trusted agents. A trusted agent is a user who has been confirmed or is otherwise trusted within the social networking system, such as a user who has been verified to be a public figure. The one or more trusted agents are selected by the social networking system based on the knowledge that each of these users is a real public figure/correct public persona. The trusted agent is connected to various users within the social networking system, and the system traverses the social graph of the trusted agent to score and identify additional users who have a sufficient connection to the trusted agent to authenticate them as other confirmed public personas/figures.

In one embodiment, there may be one or more users to be authenticated (also referred to as "target users"). The social networking system computes confidence scores of the connections of the one or more trusted agents, considering the strength of the connections (e.g., total of number of connections, number of friends shared between connected users, fraction of time on the social networking system overlap between the connected users, degrees and directions of the connections), and other relevant factors. The system continues to traverse the social graph, computing scores for connections and, through an iterative process, updating scores based on the strength of the connections. In this manner, the system can provide confidence scores for one or more target users in the social network. Based on the confidence scores of the friends or connections connecting the trusted agent(s) and the target user, the social networking system calculates the confidence score of the target user. The social networking system authenticates the target user based on his/her confidence score by determining whether the target user is a real public figure/correct public persona.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system allows users to communicate and interact with other users of the social networking system. A user is typically required to create an account with the social networking system to be able to use the functionality provided by the social networking system. A user is authenticated in order to gain access to the user account. Once a user gains access to the user account, the user can view or modify the information stored with the user account as well as interact with other users. The social networking system can store information describing the user in a user profile as well as information uploaded by the user (e.g., photos) with the user account. A user that joins the social networking system can add connections to other users.

The term "connection" refers to any other user to whom a user has formed a connection, association, or relationship via the social networking system (connections are sometimes referred to herein by using the term "friend"). Connections may be added explicitly by a user (e.g., the user selecting a particular other user to connect to), or automatically created by the social networking system based on common characteristics of the users (e.g., users who are alumni of the same educational institution). The friendships among multiple users can be represented by a social networking graph, as explained in more detail below.

Figure 1:
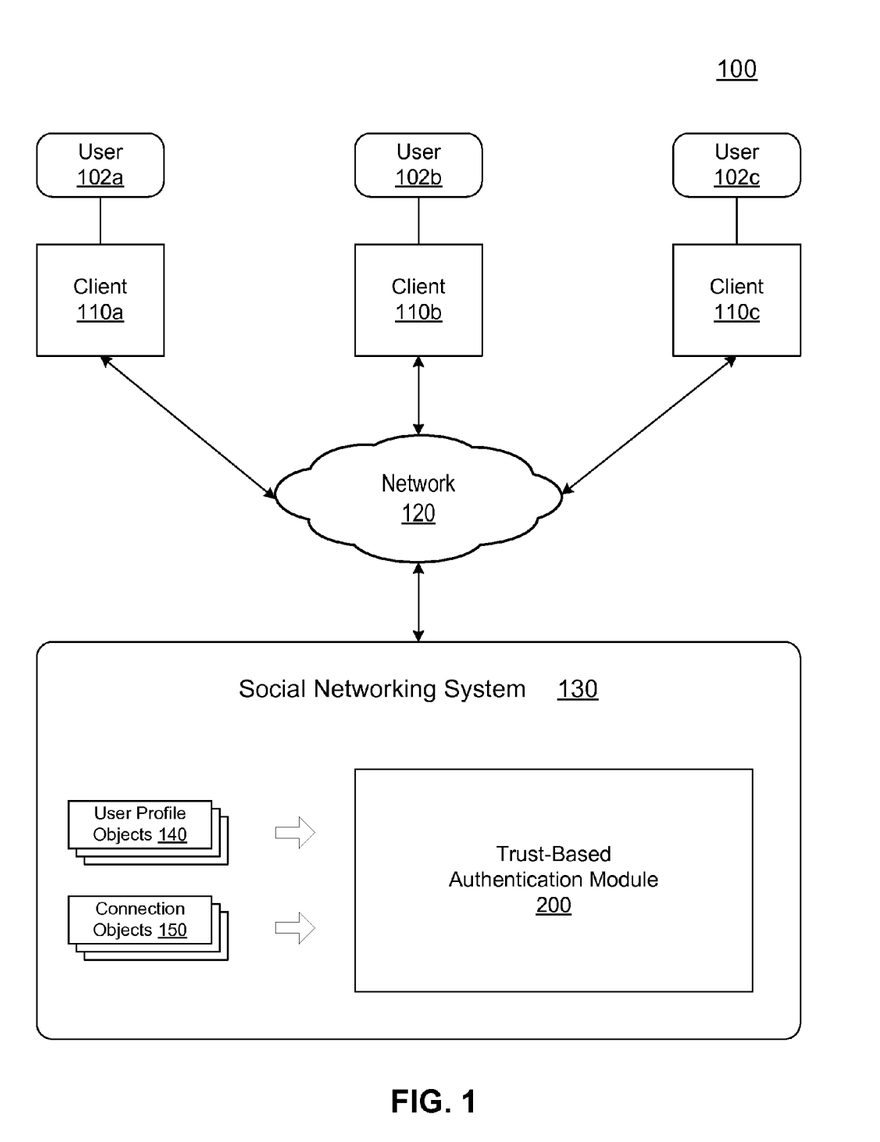
FIG. 1 is a high-level block diagram of a computing environment of trust-based user authentication in a social networking system according to one embodiment.

FIG. 1 is a high-level block diagram of a computing environment 100 of trust-based user authentication in a social networking system 130 according to one embodiment. FIG. 1 illustrates three clients 110 used by users 102 and the social networking system 130 connected by a network 120. The illustrated environment 100 represents a typical computing environment where the social networking system 130 authenticates users 102 based on a measure of confidence that a user has a user account that matches a genuine public persona/figure. Only three users 102, three clients 110 and one social networking system 130 are shown in FIG. 1 in order to simplify and clarify the description. Embodiments of the computing environment 100 can have many users 102 and clients 110 connected to the social networking system 130 via the network 120.

A user 102 is an individual that networks together socially with other users 102 in a social networking environment, e.g., a user of social networking services provided by social networking websites, such as FACEBOOK®. These users 102 can interact on social networking websites, which allow them to create online profiles or sites, communicate with others, upload photos, post comments on blogs, etc. In some embodiments, multiple users 102 of a social networking service are linked together as "friends."

A client 110 is an electronic device used by a user 102 to perform functions such as posting comments on a friend's site for the user 102, using a browser to browse websites hosted by web servers on the network 120, and interacting with the social networking system 130, and/or other entities on the network. In one embodiment, the client 110 is a personal computer (PC) executing an operating system (OS), such as a desktop, notebook, or tablet computer with a MICROSOFT WINDOW-compatible OS, APPLE OSX, and/or a LINUX distribution. In other embodiments, the client 110 is a mobile telephone, personal digital assistant, television set-top box, or other electronic device.

The network 120 enables communications between the users 102/clients 110 and the social networking system 130. In one embodiment, the network 120 is the Internet, and uses standardized internetworking communications technologies and protocols, known now or subsequently developed that enable the clients 110 to communicate with the social networking system 130. In another embodiment, the network 120 is a cloud computing network and includes one or more components of a social networking service provided by the social networking system 130.

The social networking system 130 offers its users 102 the ability to communicate and interact with other users 102 and authentication of the users 102. As illustrated in FIG. 1, the social networking system 130 includes different types of objects/modules representing entities, for example, user profile objects 140, connection objects 150, and a trust-based authentication module 200. Other embodiments of the social networking system 130 may include additional, fewer, or different objects/modules for various applications.

A user profile object 140 stores information describing a user of the social networking system 130 in a storage of the social networking system 130. The information associated with a user profile object 140 includes biographic, demographic, and other types of descriptive information, such as work experience, educational history, gender, sexual preferences, hobbies or preferences, location, and the like. The user profile object 140 may also store information provided by the users 102, for example, images, videos, comments, and status updates. Images of users may be tagged with the identification information of the appropriate users displayed in an image.

The user profile object 140 may also store information of actions that a particular user takes using the social networking system 130. Such actions may include, for example, adding a connection to another user, sending a message to another user, reading a message from another user, viewing content associated with another user, attending an event posted by another user, among others. In addition, a number of actions described below in connection with other objects are directed at particular users, so these actions are associated with those users as well.

In one embodiment, the user profile object 140 stores a personalized confidence score of a user based on his/her connections with other users in the social networking system 130. The term "confidence score" of a user refers to an estimate of confidence in the user, with respect to his/her character or other qualities, that the user has a user account that matches a genuine public figure or correct public persona of an individual who is famous within a particular domain. This estimate of confidence in the user can be formed and updated over time with the help of a variety of sources of information. In one embodiment, the confidence score of a user is estimated based on his/her connections with his/her friends in the social networking system 130, and each of the friends/connections has his/her own personalized confidence scores. The confidence score estimation is further described in reference to FIG. 2 and FIG. 3 below.

A connection object 150 stores information describing relations between two users 102 of the social networking system 130 or in general any two entities represented in the social networking system 130. In one embodiment, the connection object 150 stores data describing the connections between different users 102 of the social networking system 130, such as the number of friends shared between the users out of the total number of friends, the fraction of time since joining or becoming a member of the social networking system that overlaps between the two users (e.g., whether the users joined the social networking system at the same time or have an overlap for a certain period of time), or a combination of these signals. The record of users and their connections in the social networking system 130 may be called a "social graph."

Connections in a social networking system can be directional, e.g., one or two-way connections. For example, if Bob and Joe are both users and connected to each other in the social networking system, Bob and Joe have a two-way connection. If Bob subscribes to an entity in the social networking system, such as a page associated with a product, with a famous person, etc., this can be a one-way connection. The connection between users 102 of the social networking system 130 may be a direct connection (also called "first-degree connection"); other embodiments of a social networking system 130 allow the connection to be indirect via two or more levels of connections between a pair of users.

The social networking system 130 also includes a trust-based authentication module 200 for authenticating users 102 of the social networking system 130 based on user's confidence score indicating whether the user has a user account that matches a genuine public figure/correct public persona. The purpose of the trust-based authentication module 200 is to authenticate users in an online community based on a personalized user confidence score so that the social networking system 130 is able to build trust in and between users 102 in the online community. For example, there may be multiple users who are real and are named "Michael Jordan," but there only one who can be the famous basketball legend known to the public. It is noted that a user account of a famous public persona/figure can be subscribed to by other users in a social networking system. It is also noted that certain famous public figures are more likely to know other public figures in a particular domain, and so are likely to be connected to each other either directly or indirectly.

The trust-based authentication module 200 is configured to determine whether a user claiming to be a public figure or having the same name as a public figure (e.g., Michael Jordan) is indeed the real public figure based on the confidence scores of users connecting a known real public figure possibly within the same domain (e.g., Shaquille O'Neal) and the claiming or same named user. For example, the famous basketball players Michael Jordan and Shaquille O'Neal are within the same domain (e.g., athletes or basketball players), and are likely to be connected to each other either directly or indirectly in a social networking system (e.g., as "friends" or "friends of friends" or as subscribers to or followers of each other's posts). A user named Shaquille O'Neal has been confirmed to be the famous basketball player, and so is a trusted agent. The target user to be authenticated may be a user named Michael Jordan. If Shaquille O'Neal is connected to this Michael Jordan either directly or relatively closely through a few other users, it is more likely that this Michael Jordan is the famous basketball player, rather than a person posing as the famous basketball player or just another user who happens to have the same name.

The trust-based authentication module 200 retrieves data stored in the user profile objects 140 and connection objects 150 related to a user to be authenticated and computes a confidence score of the user with respect to one or more trusted agents, which are users that have been verified to be real public figures. Based the confidence score of the user, the authentication module 200 authenticates the user, e.g., determines whether the user is a genuine public figure or a fake one (i.e., is someone pretending to be the public figure or is someone with the same name or other identifying feature as the public figure).

Figure 2:
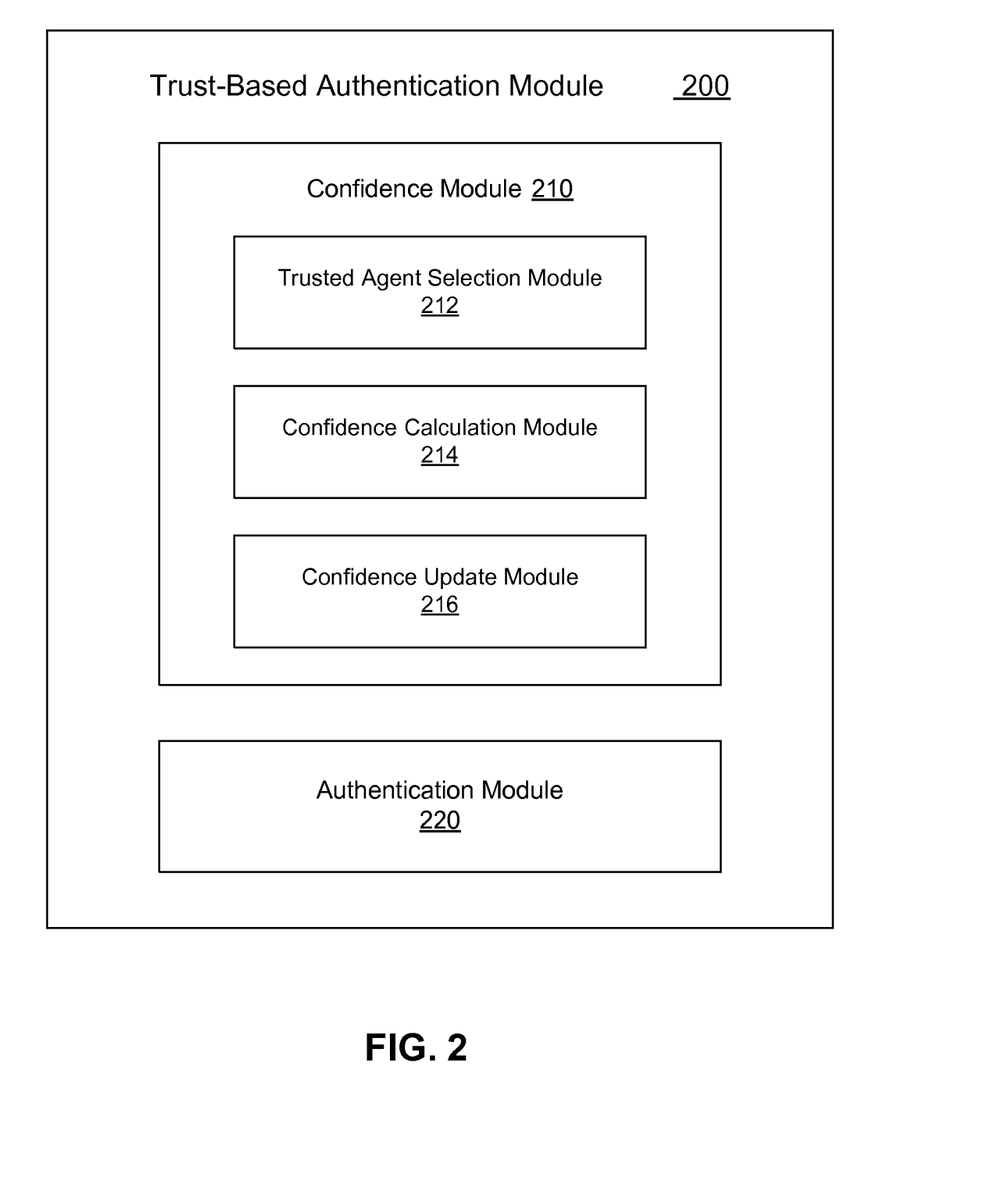
FIG. 2 is a block diagram of a trust-based authentication module of a social networking system according to one embodiment.

FIG. 2 is a block diagram of a trust-based authentication module 200 of a social networking system 130 according to one embodiment. The authentication module 200 includes a confidence module 210 and an authentication module 220. The confidence module 210 includes a trusted agent selection module 212, a confidence calculation module 214, and a confidence update module 216. The confidence module 210 computes and updates personalized user confidence scores based on user connections and other social signals associated with the user in the social networking system 130, and the authentication module 220 uses the personalized confidence scores to authenticate users in the social networking system 130.

In one embodiment, the trusted agent selection module 212 selects a limited number of trusted users from the users of the social networking system 130 and assigns a predetermined confidence score (e.g., numeric value 1 representing high confidence that a user is a real public figure) to each selected trusted user. A selected trusted user functions as a trusted agent for the personalized confidence score calculation of others users directly or indirectly connected to the trusted agent.

In one embodiment, the trusted agent selection module 212 selects a trusted user (i.e., trusted agent) from the users in the social networking system based on the knowledge that the user is a real public figure. The knowledge about a user is accumulated over time and recorded in the user's user profile objects 140 and connection objects 150. For example, the trusted agent selection module 212 first selects a limited number of users based on their user profile objects 140 as trusted agent candidates. The trusted agent selection module 212 can select the one or more trusted agents in a variety of ways, such as by simply identifying trusted user accounts that have already been confirmed in the social networking system to be real public personas for public figures. In some embodiments, for each trusted agent candidate, the trusted agent selection module 212 also verifies the trusted user candidate by authenticating the user profile information of that candidate.

A variety of methods can be used in verifying whether a user is a correct public persona for a public figure. In one embodiment, certain methods are used to authenticate user profile information. Authenticating user profile information may include, e.g., verifying the user identifier by performing optical character recognition (ORC) scanning of the identifier, verifying the home address (e.g., by sending a mailing to the address to verify it is real) and phone number (e.g., by calling or sending a message or code to the phone number to verify it is real) of the user and other types of verifications. One or more of these methods can be used in the authentication process for a user, such as the target user. In one embodiment, these methods can also be used to verify that a candidate user account for a trusted agent is the real public persona of a public figure. In this embodiment, the trusted agent selection module 212 selects one or more trusted agents, assigns a high confidence score (e.g., 1 for high confidence) to the selected trusted agents and stores the selected trusted agents and associated confidence scores in the user profile objects 140 of the trusted agents.

Another method for authenticating the target user is to compute a confidence score for the user. In some embodiments, this scoring is performed in addition to the methods described above for authenticating user profile information. The confidence calculation module 214 computes a target user's confidence score using a variety of statistical modeling schemes, e.g., simulated annealing in the context of social networking Taking a social graph representing connections of users in a social networking system as an example, the confidence calculation module 214 traverses, starting from one or more selected trusted agents, each connection that connects, directly and indirectly, the trusted agent(s) and another user.

Initially, the confidence calculation module 214 initializes the confidence scores of known trusted users to 1 and all other users to 0. At a particular iteration (e.g., current iteration t), the confidence calculation module 214 calculates a target user's confidence score based on his/her modified confidence score at previous iteration (e.g., iteration t−1) and weighted confidence scores at previous iteration of users or entities to which the target user is connected. In one embodiment, the target user's confidence score at current iteration is the sum of his/her modified confidence score at the previous iteration and a modified total confidence score of all other users or entities to which the target user is connected at the previous iteration. The target user's confidence score at the previous iteration is modified by a predetermined threshold (e.g., represented by a threshold parameter alpha) within the range of 0 and 1. The confidence calculation module 214 adds a weighted confidence score of each user or entity to which the target user is connected at the previous iteration. The weight of the confidence score of a user or entity to which the target user is connected represents the strength of the connection. The sum of the weighted confidence scores at the previous iteration of the users or entities to which the target user is connected is further modified by another threshold value (e.g., 1-alpha).

The following is an example of pseudo code for an embodiment of computing a confidence score for a user in a social graph at a particular iteration.

```
//* confidence score computation for iteration t*//
{
  Initialize the Confidence Score with 1 for known trusted users, and the Confidence Scores
    for all others users are set to 1;
  At iteration t:
    Confidence Score for user (i, t) = alpha * Confidence Score for user(i, t-1) + [1-
      alpha] * sum_j {Confidence Score for user (j, t-1) *Wij, for j in 1, ...,
      number of connections of user (i)};
  where alpha is a value within [0,1]; Wij is within the range of [0,1] and is the strength of
    the connection between user(j) and entity(j). The entity(j) can be either a friend or a page
    to which user(i) is connected;
}
```

In one embodiment, the strength Wij can be computed based on signals such as the number of shared friends, number of total friends, fraction of time on site overlap between user(i) and entity(j) or a linear combination of the above-mentioned signals. The fraction of time on site overlap between two users measures the length of time when both users joined the social networking system or website. For example, if the two users joined the social networking system/site at the same time, the fraction of time on site overlap is 1. In another example, if user(i) has been on the site for 2 years and user(j) on the site for 1 year, the fraction of time on site overlap is 0.5. The linear combination of multiple signals is done by transforming the signals through a sigmoid to guarantee the linear combination being in [0,1] range. At the end of each iteration, all confidence scores can be optionally normalized such that the maximum trust score is scaled to 1, and all the other confidence scores at the end of the iteration are linearly mapped between [0,1].

In some embodiments, other weighting factors, such as degree of a connection and direction of a connection, are included and weighted too. In this example, the trusted agent(s) are the starting nodes for connections connecting the trusted agent and others users in a social graph. The confidence calculation module 214 iterates all the connections until it reaches a user node to be authenticated and calculates the confidence score of the user being authenticated based on the confidence scores of the nodes (or users) connected to the user being authenticated. For simplicity, a user being authenticated is also referred to as "a target user."

In one embodiment, the confidence calculation module 214 generates a series of continuous scores ranging from a score indicating high confidence (e.g., 1) to a score indicating low confidence (e.g., 0) for each user. The confidence calculation module 214 considers the strength of the connections between the users by, for example, using weighting factors to reflect the influence of degree of a connection, direction of a connection, and possibly other factors. For example, the confidence calculation module 214 assigns a larger weight to a first degree connection (i.e., directly connected) than non-direct connections, where a non-direct connection farther away from the trusted agent has a smaller weight than a non-direct connection closer to the trusted agent.

The confidence calculation module 214 may further augment the target user's confidence score based on other factors, e.g., whether the trusted agent has sent an invitation (e.g., for a connection, for an event, for a game, etc.) to the target user, has interacted in some fashion with the other user (e.g., by commenting on or "liking" a post of the other user). For example, a longer fraction of time on site overlap between the target user and a another user with a high confidence score is considered to enhance the confidence in the target user.

In one embodiment, the confidence calculation module 214 uses a set of configurable values to represent the weighting factors of a connection. For example, the confidence calculation module 214 assigns 1 to the fraction of time on site overlap if the target user and a trusted agent joined the social networking system at the same time, and this decreases when they have a shorter fraction of time on site overlap. Similarly, the confidence calculation module 214 assigns different values to different weighting factors for the confidence score calculation.

The confidence calculation module 214 determines a target user's confidence score based on the confidence scores of others users who connect the trusted agent(s) and the target user. In one embodiment, the confidence calculation module 214 computes a target user's confidence score by correlating the confidence scores of other users connected (direct and indirectly) to the target user. One example of the correlation is to average the confidence scores of other users connected to the target user. If the target user is connected to multiple trusted agents, the confidence calculation module 214 can aggregate the confidences scores of the target user with respect to the trusted agents, such as calculating an average confidence score of the target user connected to multiple trusted agents.

The confidence update module 216 updates a user confidence score based on a variety of triggering events. In one embodiment, the confidence update module 216 updates the user's confidence score based on new confidence information related to the user, e.g., updated social graph due to new friends connected to the user and/or trusted agent associated with the user, and/or a change in the confidence score or trusted status of friends connected to the user. The confidence score updates can be generated in real-time, as new friends and/or other confidence information is received, or on a periodic basis.

In some embodiments, scores are iteratively updated as the social graph is traversed. For example, the scores of each node can be calculated based on the scores of its neighbors, with that calculation being iterated so that changes in scores iteratively traverse or propagate across the social graph. In this way, nodes' scores can be updated based on the changed neighbors' scores at each iteration. As another example, starting with one or with multiple trusted agents, a score can be assigned to every direct connection node of the agents' graphs, which represent the initial score estimates for those nodes. Then, scores can be calculated for all nodes connected to those nodes and, based on the strength of the connections, the system updates the scores of the direct connection nodes in this next iteration. The system can continue through various iterations and score updates until a convergence point is reached or until the system has completed a certain number of iterations.

Initially, the confidence calculation module 214 initializes the confidence scores of known trusted users to 1 and all other users to 0. The confidence calculation module 214 calculates a confidence score for the target user at a first iteration and updates the confidence score of the target user at a next iteration using his/her confidence score calculated at the previous iteration. The confidence calculation module 214 iterates through a number of iterations and updates the target user's confidence score at each iteration. At each iteration, the confidence calculation module 214 calculates the confidence score of the target user as described above. The number of iterations can be determined by a predefined total number of iterations or the iteration stops when the confidence score of the target user converges (e.g., the confidences scores of the target user through the iterations change by less than an arbitrarily small positive quantity such as epsilon). At the end of the iterations, the confidence calculation module 214 calculates an aggregated confidence score of the target user. In one embodiment, the confidence calculation module 214 calculates an averaged confidence score of the target user by dividing the total confidence score accumulated through the iterations by the total number of iterations.

The following is an example pseudo code for an embodiment of iteratively computing a confidence score for a user in a social graph.

```
//*iterative confidence score computation*//
{
    Initialize the Confidence Score with 1 for known trusted users, and the Confidence Scores
        for all other users are set to 0;
    For (iteration t ==0; iteration t < total number of iterations; iteration t++)
    {
        At iteration t:
            Confidence Score for user (i, t) = alpha * Confidence Score for user(i, t-1)
            + [1-alpha] * sum_j {Confidence Sscore for user (j, t-1) *Wij, for j in 1,
            ..., number of connections of user (i)};
            where alpha is a value within [0,1]; Wij is within the range of [0,1] and is the
            strength of the connection between user(j) and entity(j). The entity(j) can be
            either a friend or a page user(i) is connected to;
    }
    Confidence Score for user(i) = {sum (Confidence Score for user (i, t), for t=0, ..., total
        number of iteration)} / total number of iterations;
}
```

In another embodiment, the confidence update module 216 updates the user's confidence score based on the reputation of the user. For example, a user's score may be lowered based on his reputation if the user has sent a lot of connection requests that have not been confirmed, if the user rarely has his posts or comments "liked" or commented on by other users, if other users have indicated the user to be a bad user or spammer, etc. As another example, the module 216 could consider hygiene of the client 110 used by the user, such as whether the client 110 has been exposed to malicious software (malware), e.g., downloading known malware to the client 110. In one embodiment, the trust-based authentication module 200 collects and stores client hygiene information from the clients 110 periodically. The confidence update module 216 lowers the confidence score of the user responsive to a bad reputation of the user or bad hygiene of the client 110. Other embodiments may update user confidence scores based on other events, such as user being connected to a detected spammer of the social networking system 130.

The authentication module 220 communicates with the confidence module 210 and authenticates a target user based on the confidence score of the target user. In one embodiment, the authentication module 220 traverses a social graph of users connected to a real public figure (e.g., the trusted agent) and authenticates each user based on its confidence score. In an additional embodiment, the authentication module 220 traverses the social graph of users connected to a real public figure/trusted agent and computes scores for these users, and uses this to identify various other real public figures, which are then used as trusted agents to identify further real public figures. Thus, as new users attempt to pose as public figures, this system can be used to immediately identify that those users are not the real public figures already confirmed. In another embodiment, the authentication module 220 selects a target user for authentication based on one or more selection criteria, e.g., number of connections and actions taken by a user. For example, the social networking system 130 observes a sudden surge of connections to a user claiming to be a known public figure (e.g., Lady Gaga) in the social networking system 130 and receives increased complaints of useless information posted by the proclaimed Lady Gaga.

To reduce false positive authentication, the authentication module 220 may further investigate the flagged user. In one embodiment, the authentication module 220 may compare the user profile of the genuine public figure with the one of the potentially fake one (e.g., the flagged user). Any discrepancy between the user profiles based on the comparison helps the authentication module 220 to determine whether the user is indeed a public figure or is user faking the identity of the real public figure.

Calculating user confidence scores can be an expensive process in terms of computational power and computational time. In an exemplary embodiment, the user confidence scores and authentication results are cached and stored for later use. Therefore, caching the confidence scores helps to prevent the social networking system 130 from overloading in case a large number of authentication requests are received in a short period of time.

Figure 3:
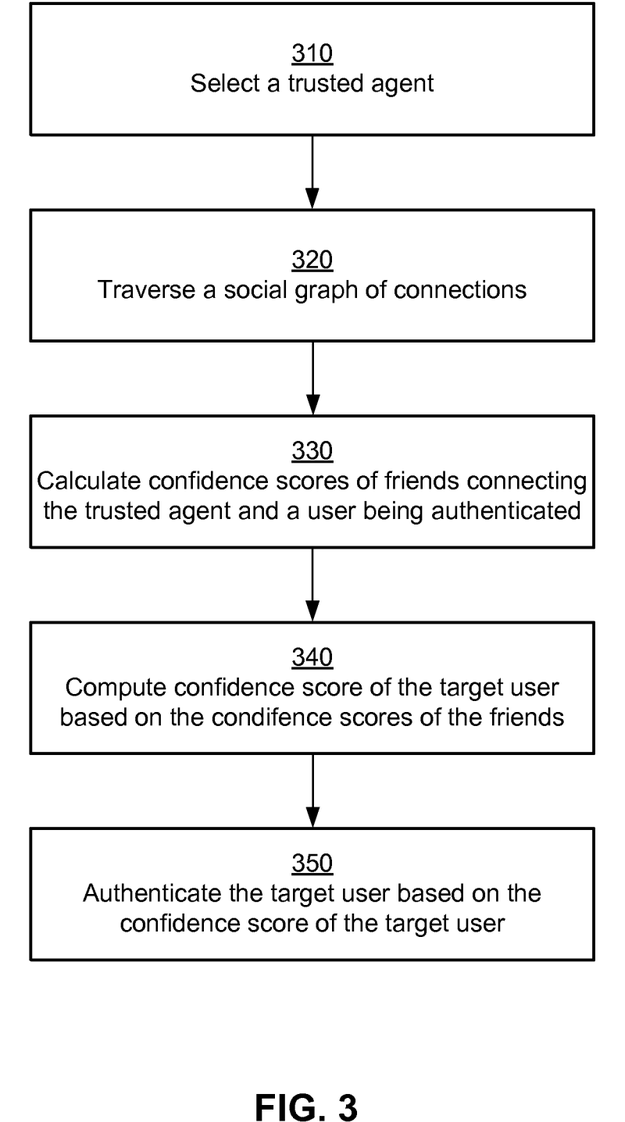
FIG. 3 is a flowchart of authenticating a user based on his/her confidence score in a social networking system according to one embodiment.

FIG. 3 is a flowchart of authenticating a user based on his/her confidence score in a social networking system 130 according to one embodiment. Initially, the trust-based authentication module 200 of the social networking system 130 selects 310a trusted user, where a trusted user is a user who has been verified to be a real public figure or the correct public persona of a public figure. The trust-based authentication module 200 traverses 320 a social graph of connections connecting the selected trusted agent and other users.

The trust-based authentication module 200 calculates 330 confidence scores of friends connecting, directly and/or indirectly, the trusted agent and a user being authenticated (e.g., a target user). The connections of users of the social networking system 130 can be represented by a social graph including the selected trusted agent, the target user and the friends connecting the trust agent and the target user. The trust-based authentication module 200 assigns a confidence score representing high confidence to the trusted agent and computes the confidence scores of the friends directly connected to the trusted agent. For example, the trust-based authentication module 200 computes the confidence scores of the friends considering the degree of the connection, direction of the connection, and/or other factors.

The trust-based authentication module 200 traverses to the next level of the connection described in the social graph and computes 330 confidence scores of the friends connected to the friends or entities at the previous level of the connection. The trust-based authentication module 200 similarly computes 330 confidence scores of other friends or entities at other levels of connection until it reaches the target user. The trust-based authentication module 200 calculates 340 the confidence score of the target user based on the confidence scores of the friends connecting to the target user.

The trust-based authentication module 200 authenticates 350 the target user based on the confidence score of the target user. The confidence score of the target user represents an estimate of whether the target user is a real public figure. A target user with a low confidence score but identifying himself/herself as a public figure is more likely to misuse the identity of the true public figure. The trust-based authentication module 200 may further investigate the target user responsive to the low confidence score associated with the target user.

With trust-based user authentication, the social networking system 130 is able to build trust and confidence among the users in the online social networking environment created by the social networking system 130. For example, the social networking system 130 can effectively identify users who misuse the identity of true public figures and prevent such users from luring unsuspecting fans to harmful websites or stealing private information of the unsuspecting fans.

ALTERNATIVE APPLICATIONS

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, it is intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method to determine the status of a user being authenticated, the method comprising:
    using a computer processor to perform a plurality of steps, wherein the steps perform;
        selecting a trusted agent, the selected trusted agent being a user who has been verified to be a public figure;
        iteratively determining confidence scores for a plurality of users, wherein a user being authenticated is connected to the trusted agent through the plurality of users, the confidence scores being based on a strength of a connection between the trusted agent and each of the plurality of users, wherein the strength of a connection between two users is determined by a factor selected from a group consisting of: a number of friends shared by the two users, a length of time overlap between when the two users joined a social networking system, a direction of the connection between the two users, and a degree of the connection between the two users;
        calculating a confidence score of the user being authenticated based on the confidence scores of the plurality of users, the confidence score of the user being authenticated representing an estimate of whether the user being authenticated having a user account that matches a verified public figure; and
        determining whether the user being authenticated is a public figure based on the confidence score of the user being authenticated.

2. The computer implemented method of claim 1, wherein selecting the trusted agent is based at least in part on knowledge of the trusted agent observed by the social networking system.

3. The computer implemented method of claim 1, wherein the trusted agent has a predetermined confidence score representing high confidence that the selected trusted agent is a public figure.

4. The computer implemented method of claim 1, wherein iteratively determining confidence scores for the plurality of users comprises:
    selecting a user from the plurality of the users, the selected user directly connected to the trusted agent;
    determining strength of the connection between the selected user and the trusted agent; and
    calculating the confidence score of the selected user based on the confidence score of the trusted agent and the strength of the connection.

5. The computer implemented method of claim 4, further comprising:

responsive to the determination of the strength of the connection, calculating a confidence score of a second user based on the confidence score of the selected user and the strength of connection between the second user and the selected user.

6. The computer implemented method of claim 1, wherein iteratively determining confidence scores for the plurality of users further comprises:
   determining hygiene of computers associated with the plurality of users, the hygiene of a computer indicating whether the computer has been exposed to malicious malware; and
   adjusting the confidence scores of the plurality of users based on the hygiene of the computers associated with the plurality of users.

7. The computer implemented method of claim 1, wherein calculating the confidence score of the user being authenticated comprises:
   correlating the confidence scores of the users that are connected to the user being authenticated; and
   calculating the confidence score of the user being authenticated based on the correlation.

8. The computer implemented method of claim 7, wherein correlating the confidence scores of the users that are directly connected to the user being authenticated comprises:
   averaging the confidence scores of the users that are connected to the user being authenticated to generate the confidence score of the user being authenticated.

9. The computer implemented method of claim 1, wherein determining whether the user being authenticated is a public figure based on the confidence score of the user being authenticated comprises:
   responsive to the user being authenticated having a bad confidence, identifying the user being authenticated as a candidate for further investigation;
   determining a true identity of the user being authenticated based on user profile, connections and events data associated with the user being authenticated.

10. A non-transitory computer-readable storage medium to determine the status of a user being authenticated, the storage medium storing computer program instructions, executed by a computer processor, the computer program instructions comprising instructions for:
   selecting a trusted agent, the selected trusted agent being a user who has been verified to be a public figure;
   iteratively determining confidence scores for a plurality of users, wherein a user being authenticated is connected to the trusted agent through the plurality of users, the confidence scores being based on a strength of a connection between the trusted agent and each of the plurality of users, wherein the strength of a connection between two users is determined by a factor selected from a group consisting of: a number of friends shared by the two users, a length of time overlap between when the two users joined a social networking system, a direction of the connection between the two users, and a degree of the connection between the two users;
   calculating a confidence score of the user being authenticated based on the confidence scores of the plurality of users, the confidence score of the user being authenticated representing an estimate of whether the user being authenticated having a user account that matches a verified public figure; and
   determining whether the user being authenticated is a public figure based on the confidence score of the user being authenticated.

11. The computer-readable storage medium of claim 10, wherein the computer program instructions for selecting the trusted agent is based at least in part on knowledge of the trusted agent observed by the social networking system.

12. The computer-readable storage medium of claim 10, wherein the trusted agent has a predetermined confidence score representing high confidence that the selected trusted agent is a public figure.

13. The computer-readable storage medium of claim 10, wherein the computer program instructions for iteratively determining confidence scores for the plurality of users comprise computer program instructions for:
   selecting a user from the plurality of the users, the selected user is directly connected to the trusted agent;
   determining strength of the connection between the selected user and the trusted agent; and
   calculating the confidence score of the selected user based on the confidence score of the trusted agent and, the strength of the connection.

14. The computer-readable storage medium of claim 13, further comprising computer program instructions for:
   responsive to the determination of the strength of the connection, calculating a confidence score of a second user based on the confidence score of the selected user and the strength of connection between the second user and the selected user.

15. The computer-readable storage medium of claim 10, wherein the computer program instructions for iteratively determining confidence scores for the plurality of users further comprise computer program instructions for:
   determining hygiene of computers associated with the plurality of users, the hygiene of a computer indicating whether the computer has been exposed to malicious malware; and
   adjusting the confidence scores of the plurality of users based on the hygiene of the computers associated with the plurality of users.

16. The computer-readable storage medium of claim 10, wherein the computer program instructions for calculating the confidence score of the user being authenticated comprise computer program instructions for:
   correlating the confidence t scores of the users that are connected to the user being authenticated; and
   calculating the confidence score of the user being authenticated based on the correlation.

17. The computer-readable storage medium of claim 16, wherein the computer program instructions for correlating the confidence scores of the users that are directly connected to the user being authenticated comprise computer program instructions for:
   averaging the confidence scores of the users that are connected to the target user to generate the confidence score of the user being authenticated.

18. The computer-readable storage medium of claim 10, wherein the computer program instructions for determining whether the user being authenticated is a public figure based on the confidence score of the user being authenticated comprise computer program instructions for:
   responsive to the user being authenticated having a bad confidence score, identifying the user being authenticated as a candidate for further investigation;
   determining true identity of the user being authenticated based on user profile, connections and events data associated with the user being authenticated.

* * * * *